United States Patent Office 3,296,514
Patented Jan. 3, 1967

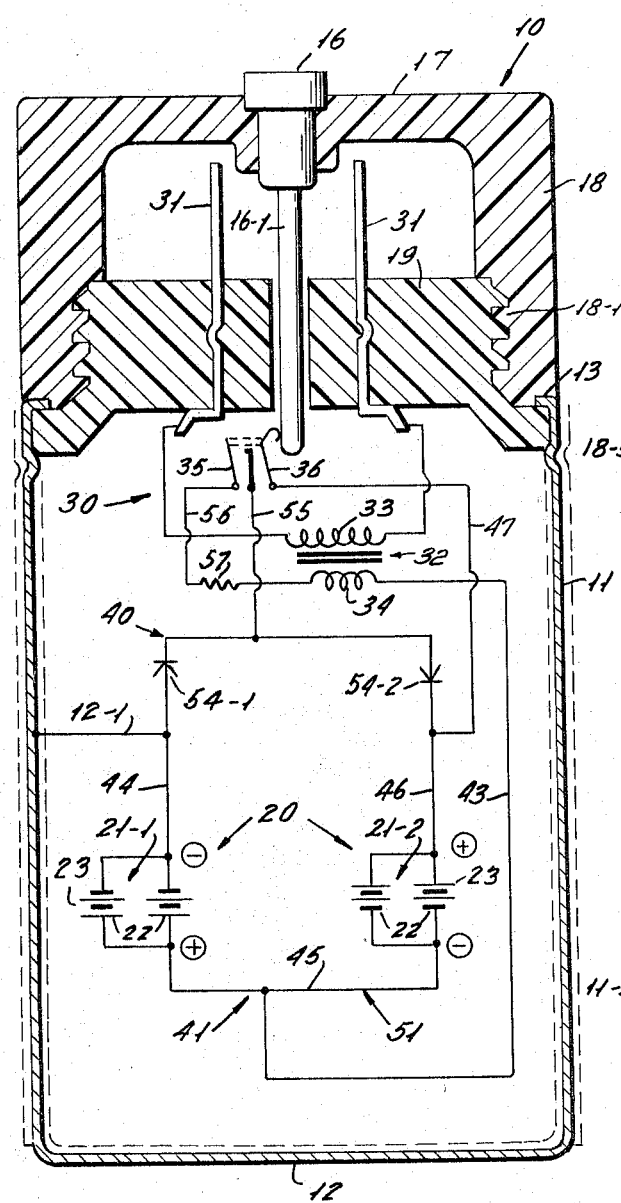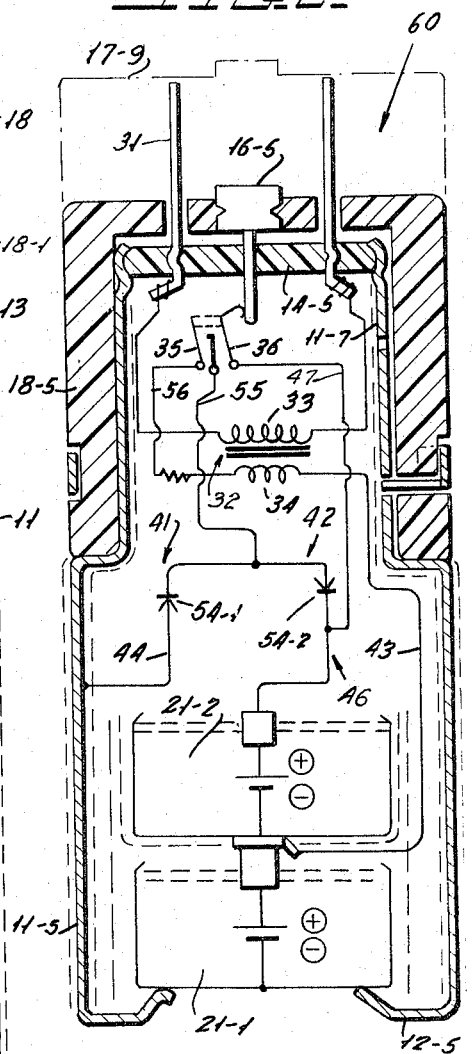

3,296,514
RECHARGEABLE BATTERY UNIT
Harry A. Pearson, White Plains, N.Y., assignor to Sonotone Corporation, Elmsford, N.Y., a corporation of New York
Filed Aug. 16, 1963, Ser. No. 302,577
2 Claims. (Cl. 320—5)

This invention relates to rechargeable battery units of the type suitable for replaceable positioning in and/or coupling to a load device such as the motor of a portable tool, flashlight and the like for supplying electric current thereto.

In most cases, such battery units have a setting member or means operable between an output setting in which the battery is set for coupling its output terminals to the load and recharging setting wherein its recharging prong terminals are exposed for connection to a power supply for recharging its battery cells. To protect the user from voltage shock while recharging the cells it is desirable to provide a transformer for insulating the higher-voltage power supply from the lower-voltage recharging circuit. It is also essential to keep the transformer size at a minimum and to assure utmost possible operating efficiency.

In accordance with the invention high efficiency in utilizing such transformer recharging circuit is obtained by providing the battery unit with at least two cell sets and a full-wave rectifier circuit responsive to actuation of the setting means to the output setting for connecting the two cell sets in series between the output terminals of the battery unit and responsive to actuation of the setting means to its recharging setting for connecting each cell set in an opposite half-wave rectifier circuit section for recharging each cell set in an opposite half-wave of the alternating power supply cycle. Each of such two cell sets may consist of one cell or of several cells connected either in series or in parallel or of several series connected cells connected parallel to each other.

The foregoing and other objects of the invention will be best understood from the following description of the exemplifications thereof, references being had to the accompanying drawings wherein:

FIGURE 1 is a partially structural view and partially a circuit diagram of one form of battery unit exemplifying the invention and FIGURE 2 is a diagrammatic view and partially a circuit diagram of another form of battery unit exemplifying the invention.

FIGURE 1 shows in part structurally and in part diagrammatically, one practical form of a rechargeable battery unit exemplifying the invention. The rechargeable battery unit 10 is of a shape similar to that described in U.S. Patent No. 3,028,536, particularly in FIG. 3 thereof. It comprises a rigid casing 11, shown as having a tubular or cylindrical shape so as to fit the interior of conventional flashlight casing or similar appliance load designed to receive a column of conventional cylindrical dry cell batteries between opposite load terminals. The casing 11 is shown as being of metal although it may be of insulating synthetic resin or the like. Within the casing 11 is housed an aggregate of battery cells 20 arranged to be connected between two output terminals 12 and 16 carried on exposed terminal wall portions of the battery unit. Output terminal 12 is formed by the metallic end wall of tubular casing 11. The other exposed output terminal 16 is affixed in an insulating opposite end wall 17 of wall section 18 of battery unit 10. Such battery unit 10 will thus replace a column of cylindrical dry cells within the interior of a tubular flashlight housing or other electrical appliance load and will couple its output terminals 12, 16 to the opposite load terminals for supplying thereto energy from the cell aggregate 20. The battery casing 11 has also a relatively rigid recharging terminal wall section 19, shown as being of insulating material, such as synthetic resin carrying two exposable outwardly projecting metallic recharging prongs or terminals 31 shaped for coupling to a conventional outlet receptacle of an alternating current or A.C. power supply circuit or for supplying recharging power to the recharging circuit 30 and recharging the battery cells 20. To protect the user against electric shock from the higher power-supply voltage incident to recharging the battery unit, a transformer 32 with a magnetic core, a primary winding 33 and a secondary winding 34 insulates all exposed metallic portions of the battery unit 10 and its metallic casing from the power circuit.

In accordance with the invention, the size of the transformer 32 is reduced to a minimum and high efficiency of the recharging circuit is assured by providing the cell aggregate 20 of the battery unit 10 with two battery cell sets 21–1, 21–2 which are arranged to be connected in series for supplying current to a load and arranged to be connected through opposite half-wave rectifier circuits to the secondary transformer windings for recharging the battery cell 20.

In accordance with the invention the battery unit includes setting means operative to selectively connect the two battery cell sets 21–1, 21–2 in series when the output terminals 12, 16 of the battery unit 10 are coupled to supply cell current to a load and to selectively connect the two cell sets 21–1, 21–2 through the transformer in opposite half-wave circuit sections of a full-wave rectifying circuit when recharging the battery cells 20 from an A.C. power supply.

One specific form of such recharging circuit shown in FIG. 1 will now be described. The primary transformer winding 33 is directly connected between the two recharging terminals 31 and therethrough to the recharging A.C. power supply. The battery cells 20 contain two generally similar cell sets 21–1, 21–2. For best results the two cell sets should have similar charging characteristics. As an example, each cell set 21–1, 21–2 may contain one or any number of cell subsets, such as cell subsets 22 connected in parallel, and each cell subset 22 may contain one or any number of cells 23 connected in series. By having two or more cells 23 in each of the cell sets 21–1, 21–2 they may be readily matched to give each cell set substantially similar charging characteristics.

The battery unit 10 has setting means shown as switch means 35 selectively actuable to an output setting shown in FIG. 1 in which the two battery sets 21–1, 21–2 are connected in series-aiding relation between the two-output terminals 12 and 16 of the battery unit 10. The setting means 35 is selectively actuable to the opposite recharging setting (to the right in FIG. 1) wherein the two cell sets 21–1, 21–2 are connected through the secondary transformer winding 34 in opposite half-wave circuit sections 41, 51 of a full-wave rectifier circuit 40 for recharging cell set 21–1 through circuit section 41 during one-half cycle and recharging cell set 21–2 through circuit section 51 during the opposite half-cycle of each full-cycle of the alternating power supply. The setting means 35 is shown as a switch, which in the operated position shown connects the two cell sets 21-1 and 21-2 in series between the two output terminals 12-16 as follows: From casing output terminal 12 through casing connection 12-1 to lead 44 from minus pole of cell set 21-1, through the series lead 45 from its plus pole to the minus pole of second cell set 21-2, lead 46 from its plus pole, and its lead connection 47 to switch contact 36 engaging inward prong extension 16-1 of the opposite output terminal 16 of the battery unit 10.

In the opposite recharging setting of the battery unit, its setting means or switch means 35 is released to its recharging setting wherein it connects the two cell sets 21-1, 21-2 in two half-wave circuit sections 41 and 51 of a full wave rectifier circuit 40. In accordance with the invention, the full wave rectifier circuit includes secondary transformer winding 34 for recharging cell set 21-1 in one half cycle and recharging the opposite cell set 21-2 in the opposite half cycle of each full cycle of the A.-C. power system. One half-wave charging circuit 41 which charges cell set 21-1, leads from the right side of transformer secondary winding 34 through lead 43, series connector 45 between the two cell sets, to plus pole of cell set 21-1, thence from its minus pole, lead 44, through rectifier 54-1, lead 55, closed switch contact 53, lead 56 which may include an adjusting resistance 57, to the left side of secondary transformer winding 34. The opposite half-wave charging circuit 51, which charges the opposite cell set 21-2, leads in analogous manner from the right side of transformer winding 34 through cell set 21-2 and the oppositely poled rectifier 54-2 and returns through closed switch contacts 35 to the left side of secondary transformer winding 34.

The selective actuation of setting means 35 may be controlled in a variety of ways so as to be automatically actuated to the recharging setting when the recharging terminals 31 are coupled to a power supply and to be actuated to the opposite output setting in which the two cell sets 21-1, 21-2 are connected in series between the two output terminals 12, 16 of the battery unit. Thus, any of the arrangements of the battery setting means described in Bilsky U.S. Patent No. 3,028,536 may be utilized for selective actuation of the setting means 35 described above to either one of the desired opposite settings.

FIG. 1 shows one example of such battery unit. The upper end wall member 18 serves as a setting member movable from the output setting, in which it is shown, to recharging setting wherein the underlying two recharging prongs 31, are exposed for insertion into a conventional power supply receptacle. In the form shown, end wall setting member 18 is held in engagement with the complementary terminal wall 19 of the battery casing 11. Upon moving the end wall setting member 18 on its threads 18-1 to upward removed recharging setting, the underlying terminal wall 19 and its recharging prong terminals 31 are exposed for insertion into a power receptacle and the setting switch means 35 of the battery unit are released to their closed position by withdrawal of terminal extension 16-1 of output terminal 16 from its inward positon in which it is shown in FIG. 1. By returning the end wall setting member 18 on its threads 18-1 to the output setting shown in FIG. 1, the output setting of setting switch means 35 is automatically restored to the output setting shown.

FIG. 2 shows an embodiment of the invention in which the movable setting member 18-5 is slidably carried by the adjacent casing portion 11-7 in the manner shown and explained in connection with FIGS. 3, 3-A, 4 and 5 of Bilsky U.S. Patent 3,028,536 for operation with a recharging circuit of the invention described in connection with FIG. 1. In FIG. 2 the battery casing 11-5 holds a column of only two cells 21-1, 21-2, corresponding to the two sets of cells 21-1 and 21-2 of FIG. 1 and arranged to be selectably connected in series in the output setting and to be recharged in opposite half-waves of each cycle of the A.C. power supply as described in connection with FIG. 1.

The embodiments of the invention in which an exclusive privilege or property is claimed are as follows:

1. A self-supporting battery unit adapted to be interchangeable with conventional dry cells for energizing a load, such as a flashlight,
said battery unit comprising a tubular housing having a pair of transverse end walls, joined by a continuous cylindrical wall,
said tubular housing containing two rechargeable cell sets each having at least one rechargeable cell and two opposite cell poles,
two output terminals at said transverse end walls for removable coupling of said two cell sets to a load and supplying cell current thereto
and two recharging terminals normally concealed by one of said transverse end walls for removable coupling of said two cell sets to alternating current power supply and recharging said two cell sets,
a transformer core in said tubular housing having primary and secondary transformer windings, said primary winding being connected between said two recharging terminals,
a full-wave recharging circuit in said tubular housing for recharging said two cell sets with alternating current from said secondary winding comprising
a cell connection from the positve pole of one cell set to the negative pole of the further cell set of said two cell sets,
two rectifier means each with opposite poles,
a rectifier connection between one pole of one and the opposite pole of the further of said two rectifier means,
a pole connection from the opposite pole of said one rectifier means to the negative pole of said one cell set
and a pole connection from the one pole of said further rectifier means to the positive pole of said further cell set,
and control means within said tubular housing actuable to an output setting for serially connecting said two cell sets through said two pole connections between said two output terminals and supplying cell current therethrough
said control means selectively actuable upon movement of said one transverse end wall to reveal said recharging terminals to a recharging setting for connecting said secondary winding between said cell connection and said rectifier connection
and causing alternating current from said secondary winding to pass opposite half-waves of each alternating current cycle through said two cell sets, respectively.

2. In a battery charging system, adapted to be interchangeable with conventional dry cells for energizing a load, such as a flashlight,
said battery charging system confined within a housing as an integral self-contained unit, and including:
two rechargeable cell sets each having at least one cell, and a positive and negative terminal for supplying direct current to a load in an output direction,
two alternating current supply leads,
two rectifier means each having a rectifying direction for supplying rectified direct current in opposite rectifying directions from said alternating current,
charging circuit means including a transformer having a primary winding connected to said supply leads and a secondary winding connected to the circuits of said rectifier means and said cell sets,
said charging circuit means connecting one of said rectifier means in series with one of said cell sets and said transformer secondary winding in one of said rectifying directions and connecting the other of said rectifier means in series with other of said cell sets and said transformer secondary winding in the opposite of said rectifying directions for causing alternating current from said secondary winding to recharge one of said cell sets in one half-wave and recharge the other of said cell sets in the opposite half-wave of consecutive alternating current cycles of said supply leads, further circuit means selectively actuable for connecting said two cell sets in series for supplying direct current with their series aiding voltage to a load, a cell connection from the positive pole of one cell set and the negative pole of the other cell set constituting part of said further circuit means and of said charging circuit means.

References Cited by the Examiner
UNITED STATES PATENTS

| | | | |
|---|---|---|---|
| 1,745,841 | 2/1930 | Bradbury | 320—15 X |
| 2,281,387 | 4/1942 | Sears | 320—15 |
| 2,835,826 | 5/1958 | Vadas | 320—7 X |
| 3,028,536 | 4/1962 | Bilsky | 320—2 |

JOHN F. COUCH, *Primary Examiner.*

LLOYD McCOLLUM, *Examiner.*

S. WEINBERG, *Assistant Examiner.*